Dec. 19, 1967     E. MAUDE     3,358,299
MAINTENANCE OF URINALS, WATER CLOSET
BASINS AND THE LIKE

Filed June 18, 1965     7 Sheets-Sheet 1

INVENTOR:
EDWARD MAUDE
BY
Browne, Schuyler Beveridge
ATTORNEYS

Dec. 19, 1967  E. MAUDE  3,358,299
MAINTENANCE OF URINALS, WATER CLOSET
BASINS AND THE LIKE
Filed June 18, 1965 7 Sheets-Sheet 4

INVENTOR:
EDWARD MAUDE
BY
ATTORNEYS

Dec. 19, 1967  E. MAUDE  3,358,299
MAINTENANCE OF URINALS, WATER CLOSET
BASINS AND THE LIKE
Filed June 18, 1965  7 Sheets-Sheet 7

INVENTOR:
EDWARD MAUDE
BY
Browne, Schuyler & Beveridge
ATTORNEYS

United States Patent Office 3,358,299
Patented Dec. 19, 1967

3,358,299
MAINTENANCE OF URINALS, WATER CLOSET BASINS AND THE LIKE
Edward Maude, Nantwich, England, assignor to Calmic Limited, Crewe, England, a British company
Filed June 18, 1965, Ser. No. 465,133
Claims priority, application Great Britain, May 28, 1963, 21,196/63; Nov. 7, 1964, 45,473/64
9 Claims. (Cl. 4—225)

This application is a continuation-in-part of application Ser. No. 368,867 filed May 20, 1964.

The present invention relates to the maintenance of urinals, water closet basins and the like flushed conveniences (hereinafter collectively referred to as conveniences or flushed conveniences) in a relatively clean, odour-free and sanitary condition.

The present invention resides in forming, during an interval between flushes, a relatively concentrated aqueous disinfectant solution from a viscous slowly mobile disinfectant composition, for example, a paste, emulsion or jelly, diluting the concentrated solution during a flush and discharging the diluted solution into the convenience at the end of the flush.

In a preferred mode of carrying the invention into effect the relatively concentrated aqueous solution is formed by holding the disinfectant composition in contact with one face of a layer, wad, or plug or reticulate or foraminous material for example sponge the opposite face of which is in contact with a relatively small quantity of still water.

The viscosity of the disinfectant composition should be sufficient to enable it to be retained by a reticulate or foraminous layer, wad or plug, for example sponge, therebeneath but its mobility should be sufficient to enable it to remain in contact with said layer, wad or plug during consumption thereof in the formation of the concentrated solution.

Delivery of the diluted disinfectant solution to the convenience at the end of a flush tends to avoid wastage and leaves the surface of the convenience wetted with the solution so as to enable it to exert its disinfectant action thereon for a much longer period of time than would be the case if it were delivered with the flush.

The disinfectant composition may incorporate a bactericide and a detergent, one of which is preferably in solid form. A suitable composition may contain about 50% by weight of a quaternary ammonium compound preferably in a solid state dispersed in a liquid detergent which is compatible with the quaternary ammonium compound and which is present in a concentration of about 35% to 40%. The dispersion may be diluted with a liquid agent such as propylene glycol to afford thereto an appropriate degree of viscosity. Suitable compositions can also be formulated when both detergent and bactericide are in liquid form. With such formulations it will usually be necessary to include a water soluble thickening agent, filler or the like to afford thereto an appropriate balance between mobility and viscosity.

In practice the said relatively concentrated aqueous solution may contain approximately 2% of the quaternary ammonium compound and the diluted solution discharged into the convenience at the end of a flush may contain from 2 to 15 parts of the quaternary ammonium compound per million. When delivered in these concentrations the bactericidal quaternary ammonium compound can destroy or inhibit the growth of bacteria which give rise to decomposition of urates and to the malodor experienced in conveniences. The incorporaion of a detergent suplements the wetting effect of the quaternary ammonium compound and so prevents or minimises the formation of incrustation frequently found in conveniences where bactericidal decomposition takes place.

The present invention includes the possibility of using bactericides other than quaternary ammonium compounds, for example phenolic derivatives such as chlorcresols, hexacholorophene, hexylresorcinol and similar substances, which are capable of inhibiting the growth of urea-splitting organisms in relatively extreme dilutions.

A device according to the present invention comprises an outer container having a pipe connection leading from its base for feeding water to the outer container from a flushing system during a flush and for returning it to the flushing system at the end of the flush; an inner container for a viscous slowly mobile disinfectant composition open at its lower end and which is spaced above the base of the outer container and which is closed by a layer, wad or plug of reticulate or foraminous material for example sponge on the upper face of which the disinfectant composition can rest and a baffle or weir between the inner container and said connection adapted to retain a sufficient depth of water beneath the inner container to keep the retained water in contact with or to submerge the lower face of the sponge.

The said baffle or weir may comprise a projection of said pipe connection into and above the base of the outer container.

The said outer container may be arranged to provide accommodation for a supply of deodorant, such for example as a deodorant pad, from which a deodorant draught may be caused to emerge as a result of a displacement of air from the container by the ingress of water thereto through said pipe connection during a flush.

Such a device may not be satisfactory for so-called "Low-Level Suites" as insufficient pressure is developed in the flush pipe during a flush to fill the outer container.

According to the present invention, another device for maintaining a flushed convenience in a relatively clean, odor-free and sanitary condition comprises an outer container adapted to be supported within the cistern of a flashing system for the convenience with an upper opening of the outer container in the region of the normal "full" water level of the cistern, an inner container for a viscous slowly mobile disinfectant composition open at its lower end which is spaced above the base of the outer container and which is closed by a layer, wad or plug of reticulate or foraminous material, for example sponge, on the upper face of which the disinfectant composition can rest and a syphon tube whose outlet is outside said outer container and whose inlet is within said outer container at a level to retain a sufficient depth of water beneath the inner container to keep the retained water in contact with or to submerge the lower face of said layer, wad or plug of reticulate or foraminous material.

Conveniently the outer container is secured to a pumping device which is the form of a separate inverted vessel with a conduit connection at its upper end which may be connected to a separate deodorizer. When the water level in the cistern rises, air is trapped in this separate vessel and is expelled through the deodorizer containing a deodorant pad, thereby causing a deodorant draught to emerge from the deodorizer.

The inner container may comprise an inverted bottle with a sponge plug inserted in the neck of the bottle.

The invention is further described by way of example with reference to the accompanying drawings in which.

Figure 1:
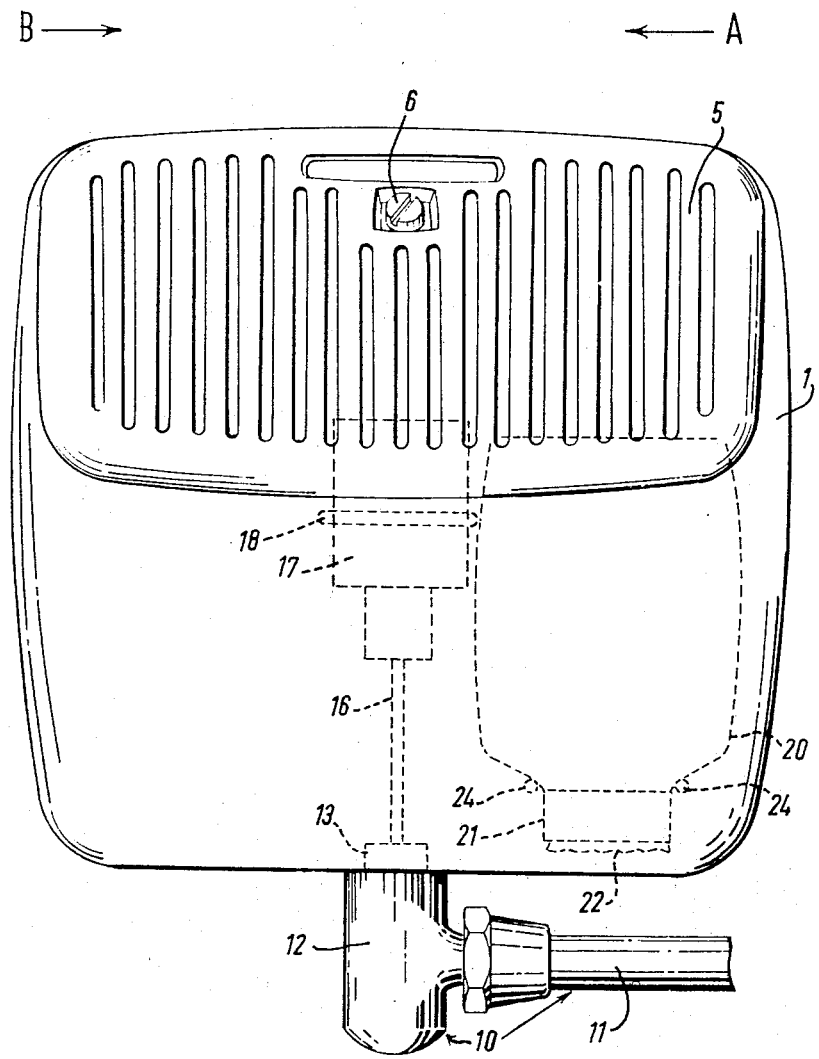
FIG. 1 is a front view of one form of device according to the present invention.
Figure 2:
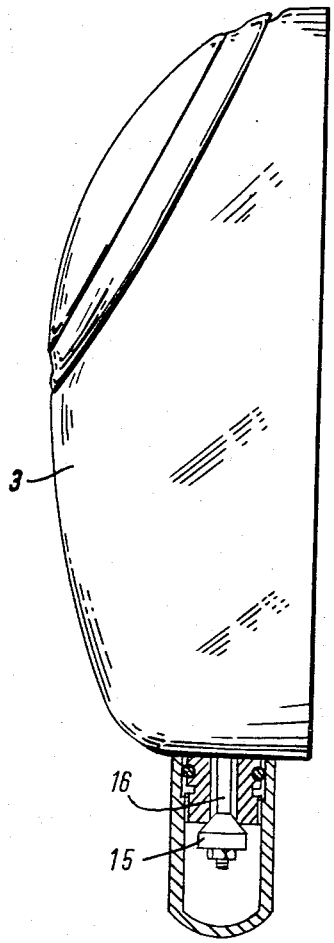
FIG. 2 is a part sectional side view looking in the direction of the arrow A of FIG. 1.
Figure 3:
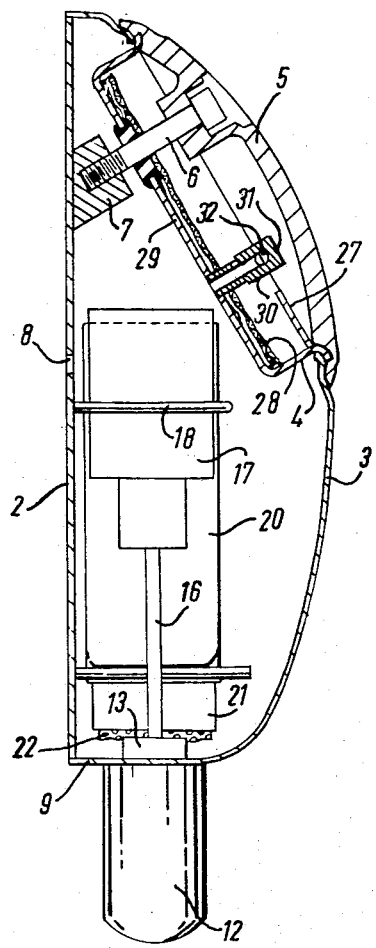
FIG. 3 is a part sectional side view looking in the direction of the arrow B of FIG. 1.
Figure 4:
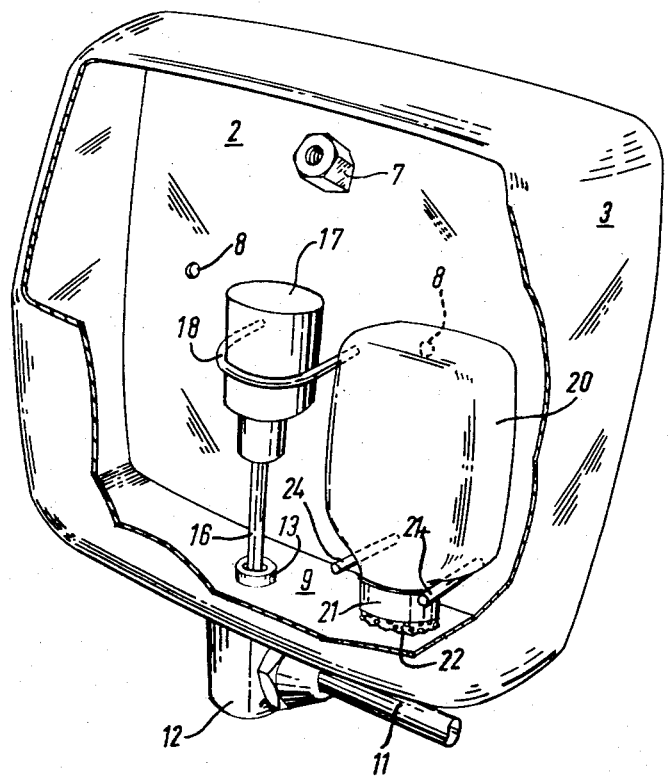
FIG. 4 is a perspective view corresponding to FIG. 1 with part of the outer container broken away to reveal the interior.

Referring to the embodiment of FIGS. 1 to 4, the outer container 1 comprises a backplate 2 sealingly secured to a dished front plate 3 (FIG. 3). Near its upper end the front plate 3 has formed therein a more or less rectangular opening in which is received a deodorant compartment 4. The compartment 4 is closed externally by a grille 5. The compartment 4 and grille 5 are secured in position by a screw 6 which engages in a threaded socket 7 on the inner face of the backplate 2. The backplate 2 has two openings 8 therein to enable it to be secured to a supporting surface such as a wall.

A pipe connection generally referenced 10 is secured to the base 9 of the outer container 1. A pipe 11 of the pipe connection 10 leads to a flush pipe. The pipe connection 10 includes a valve housing 12 having a spigot 13 which projects into the outer container 1 to a level above the level of the base 9. A valve 15 (FIG. 2) in the valve housing 12 has a valve stem 16 connected at its upper end to a float 17. The float 17 is guided by a wire stirrup 18 secured to the backplate 2. The float 17 comprises a sealed hollow container which may be of metal or plastic material.

Inner container 20 comprises a bottle formed of plastic material having a neck 21 with a sponge plug 22 inserted therein. The bottle is shouldered at opposite sides of the neck 21 and is supported at the shoulders by parallel horizontal rods 24 which extend forwardly from the backplate 2.

The deodorant compartment 4 has a transversely extending upward lip 27 for the retention therein of a supply of liquid deodorant. A pad 28 rests on the back 29 of compartment 4 and extends below the level of the upper edge of the lip 27 to enable it to dip into the deodorant liquid contained in the compartment 4. A tube 30 is secured to the back 29 of compartment 4 and communicates at its inner end with the interior of the container 1. Its outer end 31 is closed but near its outer end it is formed with opposite horizontally directed holes 32.

When a flush occurs down the flush pipe to which pipe 11 is connected flush water will enter and rise in out container 1 and at the end of the flush will drain therefrom to the convenience that the flush pipe serves. Float 17 and valve 15 are arranged to prevent the water from rising too far.

The ingress of water into the container 1 will cause air to be ejected through tube 30 and through holes 32 therein to give rise to the deodorant draught through the grille 5.

At the end of a flush a small quantity of water will be retained in the bottom of the outer container 1 by the spigot 13 serving as a weir or barrier. The level of the bottle 20 in relation to the upper end of the spigot 13 is such that the lower face of the sponge 22 is at least in contact with and preferably slightly submerged in the water retained by the spigot 13. A viscous slowly mobile disinfectant composition is contained in the bottle 20 and permeates the sponge 22 so that between suitably spaced flushes a relatively concentrated aqueous disinfectant solution is formed in the bottom of the outer container 1. When the next flush occurs the concentrated solution is diluted by flush water entering the outer container through pipe connection 10 and the diluted solution is discharged through the pipe connection 10 at the end of flush.

The baffle or weir provided by the spigot 13 may be replaced by a low wall running across the outer container from back to front at a position between the valve housing 12 and the inner container 20.

The device illustrated in FIGS. 1 to 4 is not suitable for a low-level suite as insufficient pressure is developed in the flush pipe during a flush for the container 1 to be filled through the pipe 11.

Figure 5:
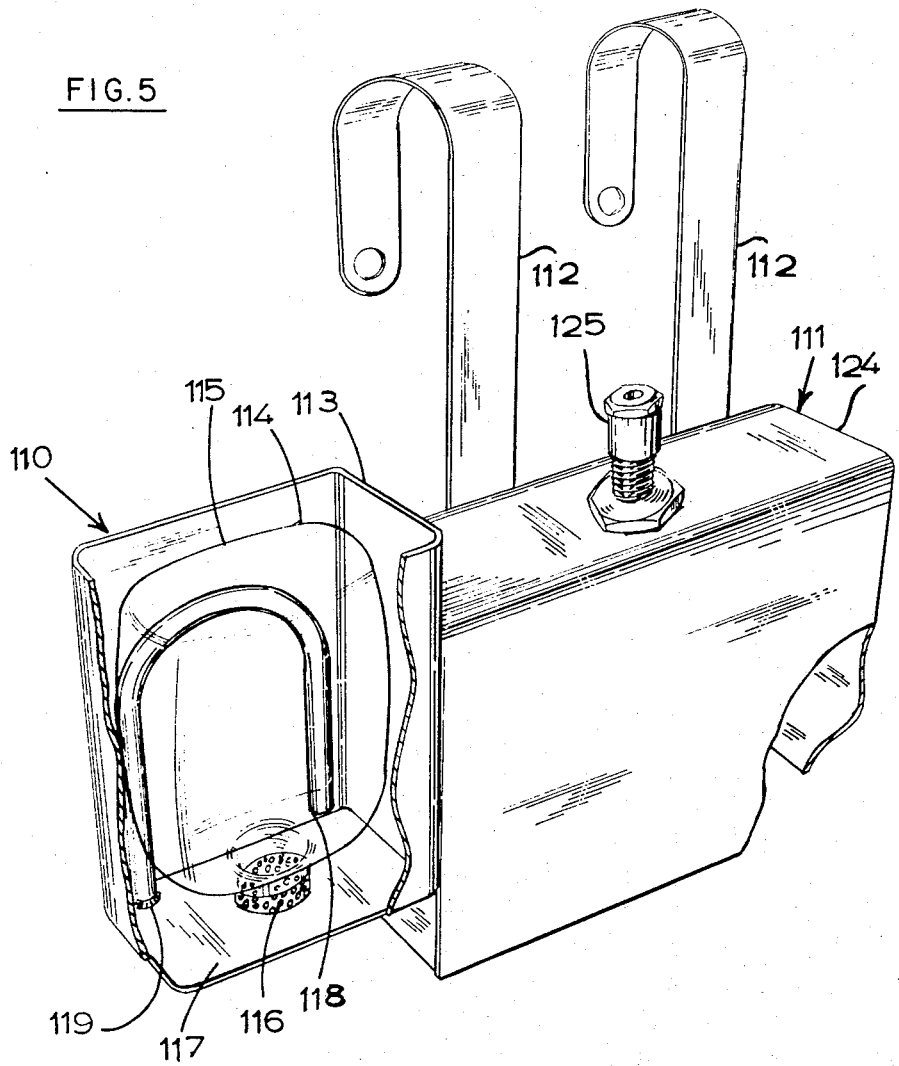
FIG. 5 is a perspective view, partly broken away, of another device constructed in accordance with the present invention and attached to a pumping device for causing a deodorant draught.

Referring now to FIG. 5 of the drawings, a device 110, constructed in accordance with the present invention, for maintaining a flushed convenience in a relatively clean and odour-free sanitary condition, is attached to a pumping device 111 to the back of which are secured two mounting strips 112 which enable the device 110 and the pumping device 111 to be supported within a low-level cistern of a flushing system for a flushed convenience.

The device 110 comprises an outer upright container 113, an inverted inner container 114 and a syphon tube 115. The outer container 113 is conveniently constructed of brazed sheet metal whilst the inner container 114 is conveniently a glass bottle. A sponge plug 116 closes the mouth of the bottle 114 and holds the mouth of the bottle spaced slightly from the floor 117 of the outer container 113. The bottle 114 contains a disinfectant composition, preferably one of the compositions described above. The inlet 118 of the syphon tube 115 is also spaced from the floor 117 of the outer container 113 and is at a level to ensure that water is retained in the outer container to a sufficient depth to at least contact the lower face of the plug 116. The outlet 119 of the syphon 115 is to the exterior of the outer container 113 through its floor 117. As shown, the syphon tube 115 is conveniently an inverted U-tube wholly within the outer container 113 and secured therein by welding or brazing of its outlet 119 to the floor 117.

In operation, after flushing, a certain amount of water is retained in the bottom of the outer container 113 and some of the disinfectant composition flows out of the bottle 114 through the sponge plug 116 to form a concentrated disinfectant solution in the retained water. The cistern fills at least to a level above the top of the syphon 115 so that water can flow into the outer container 113 and dilute the concentrated disinfectant solution. Upon commencement of another flush, the water level in the cistern falls rapidly but the dilute solution in the outer container 113 can only flow out of this chamber relatively slowly so that a relatively large proportion of the contents of the container 113 are discharged into the cistern at or towards the end of the flush when the cistern is almost empty. This results in the diluted disinfectant solution being discharged into the convenience from the cistern at the end of the flush. As the inlet 118 of the syphon tube 115 is spaced from the floor 117 of the container 113, a small proportion of the diluted solution is retained in this container to dissolve further disinfectant composition which seeps through the plug 116 from the bottle 114 before the cistern refills and form a fresh concentrated disinfectant solution so that the above described process can be repeated.

The strips 112 for mounting the device within the cistern are conveniently hooked over the sides of the cistern and may be appropriately bent so that the open mouth of the container 113 is slightly above the normal full water level of the cistern. The mouth of the container 113 may, however, be slightly below the normal full water level as very little diffusion of the contents of the container 113 into the cistern water will take place when the cistern is full.

Figure 6:
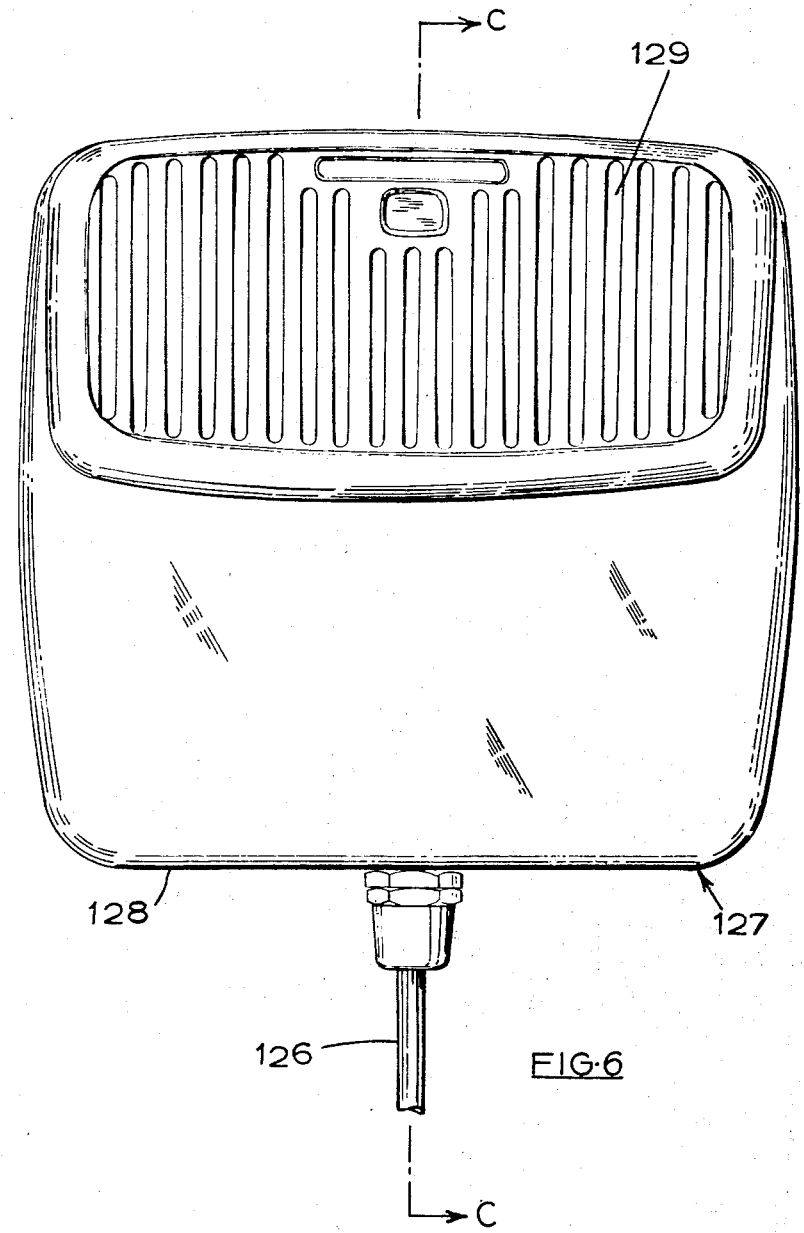
FIG. 6 is a front elevation of a deodorizer which may be connected to the pumping device of FIG. 5.
Figure 7:
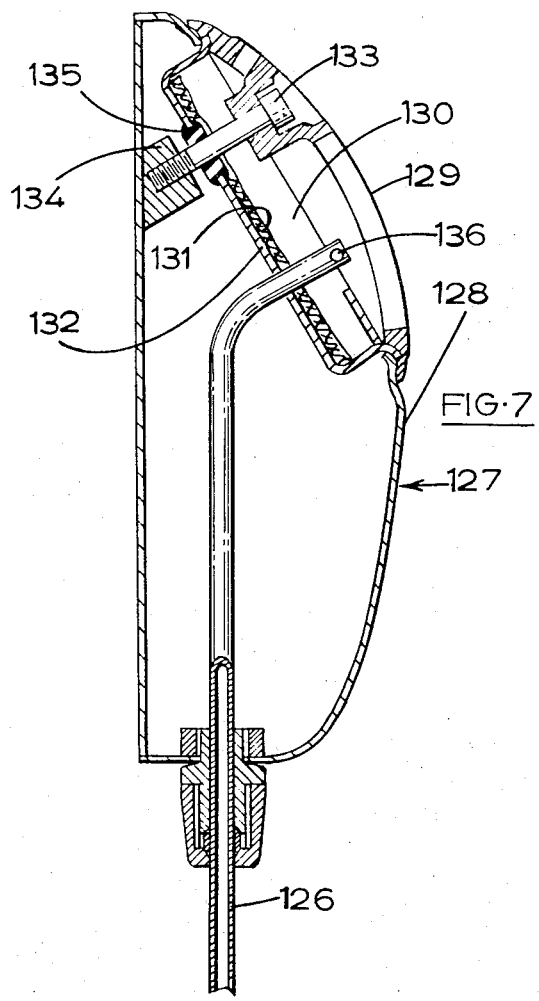
FIG. 7 is a section on line C—C of FIG. 6.

The pumping device 111 comprises an inverted vessel 124 conveniently formed of brazed sheet metal and provided with a union 125 at its upper end for connection to one end of a small bore tube 126 (not shown in FIG. 5, but shown in FIGS. 6 and 7). As the water level in the cistern rises, air is trapped in the vessel 124 and thereby forced or "pumped" through the tube 126. The other end of the tube 126 is connected to a deodorizer 127 shown in FIGS. 6 and 7 to which reference will now be made. The deodorizer 127 comprises a housing 128 fitted at its front with a grille 129. Behind the grille 129 is a deodorant compartment 130 containing a deodorant pad 131. The pad 131 rests against the back wall 132 of the compartment 130. The grille 129 and the back wall 132 are retained by a screw 133 screwed into a boss 134 on the rear wall of the housing 128. A grommet 135 seals the screw 133 to the back wall 132. The outlet end of the tube 126 is disposed within the deodorant compartment 130 and is provided with nozzles 136. The pumping action of the pumping device 111 causes air to be expelled through the nozzles 136 into the deodorant compartment 130 whereby a deodorant draught emerges through a grille 129 each time the cistern refills.

I claim:

1. A device for maintaining a convenience having a flushing system, such as a urinal or water closet in a relatively clean, odour-free and sanitary condition, comprising an outer container, a pipe connection leading from the base of the outer container for feeding water to the outer container via said pipe connection during a flush to fill said outer container to a given level from the flushing system and for returning it to the flushing system at the end of a flush, an inner container for a mobile viscous disinfectant composition, said inner container being open at its lower end which is spaced above the base of the outer container, a wad of foraminous material such as a sponge plug closing the open end of said inner container and on the upper face of which the disinfectant composition can rest, and a weir between the inner container and said pipe connection, said weir being located below said given level and above at least a portion of said wad to permit water to return to the flushing system and to retain a sufficient depth of water beneath the inner container to keep the retained water at least in contact with the lower face of said wad.

2. A device according to claim 1 in which said weir is formed by a projection of said pipe connection into the outer container.

3. A device according to claim 1 in which the inner container comprises an inverted bottle and in which said wad comprises a sponge plug in the neck of the bottle.

4. A device according to claim 1 comprising a deodorant compartment at the upper end of the outer container, an external grille closing said deodorant compartment, said deodorant compartment being in communication with the interior of the outer container to enable air displaced by water rising in the outer container to escape through the deodorant compartment and through said external grille.

5. A device for maintaining a convenience having a flushing system with a cistern adapted to be filled to a normal "full" water level, such as a urinal or water closet, in a relatively clean, odour-free and sanitary condition comprising an outer container having an opening and adapted to be supported within the cistern of the flushing system with said opening upwards and in the region of the normal full water level of the cistern, an inner container for a mobile viscous disinfectant composition, said inner container being open at its lower end which is spaced from the base of the outer container, a wad of foraminous material such as a sponge plug closing the open end of said inner container and on the upper face of which the disinfectant composition can rest and a syphon tube having an outlet outside said outer container and an inlet within said outer container at a level to retain a predetermined depth of water beneath the inner container and in contact with at least the lower face of said wad.

6. A device according to claim 5 in which the inner container comprises an inverted bottle and in which said wad comprises a sponge plug in the neck of said bottle.

7. A device according to claim 5 to which pliable metal strips are attached for securing said device in said cistern.

8. A device according to claim 5 further comprising pumping means attached to said outer container and operative to pump air by the rise and fall of water in said cistern, deodorizer means containing a deodorant pad and conduit means connecting said pumping means to said deodorizer means for blowing pumped air through said deodorant pad.

9. A device according to claim 8 wherein said pumping means comprises an inverted vessel and said conduit means is connected to the upper end thereof.

References Cited

UNITED STATES PATENTS

| | | |
|---|---|---|
| 681,100 | 8/1901 | Calkins. |
| 959,111 | 5/1910 | Buckland. |
| 1,293,407 | 2/1919 | Goodhue _____ 4—223 |
| 1,623,132 | 4/1927 | Pennell et al. _____ 4—109 X |
| 2,075,266 | 3/1937 | Bowman _____ 4—224 |
| 2,623,217 | 12/1952 | Ward _____ 4—222 |
| 2,682,059 | 6/1954 | Gressman _____ 4—225 |
| 3,002,197 | 10/1961 | Tillman _____ 4—225 |

SAMUEL ROTHBERG, *Primary Examiner.*

H. K. ARTIS, *Assistant Examiner.*